(12) United States Patent
Peters

(10) Patent No.: US 10,532,292 B2
(45) Date of Patent: Jan. 14, 2020

(54) THIN-FILM TREATMENT APPARATUS

(71) Applicant: BUSS-SMS-CANZLER GMBH, Butzbach (DE)

(72) Inventor: Hans Peters, Weil (DE)

(73) Assignee: BUSS-SMS-CANZLER GMBH, Butzbach (DE)

( * ) Notice: Subject to any disclaimer, the term of this patent is extended or adjusted under 35 U.S.C. 154(b) by 59 days.

(21) Appl. No.: 15/729,284

(22) Filed: Oct. 10, 2017

(65) Prior Publication Data

US 2018/0128557 A1    May 10, 2018

(30) Foreign Application Priority Data

Nov. 8, 2016  (EP) .................................... 16197654

(51) Int. Cl.
    *B01D 1/22*    (2006.01)
    *B01J 19/24*   (2006.01)
    (Continued)

(52) U.S. Cl.
    CPC ............ *B01D 1/225* (2013.01); *B01J 19/247* (2013.01); *F28D 7/1607* (2013.01); *F28F 27/00* (2013.01);
    (Continued)

(58) Field of Classification Search
    CPC ...... B01D 1/0082; B01D 1/225; B01J 19/247; B01J 2219/00058; B01J 2219/24;
    (Continued)

(56) References Cited

U.S. PATENT DOCUMENTS 3,542,112 A * 11/1970 Monty .................... B01D 1/223
                                               159/44
3,977,936 A *  8/1976 Murakami ............. B01D 1/225
                                               159/49

(Continued)

FOREIGN PATENT DOCUMENTS

CH           523 087 A     5/1972
DE        41 17 630 A1    12/1992
             (Continued)

OTHER PUBLICATIONS

JPA_1987262701_ENG (J Plat Pat machine translation of Suzuki) (Year: 1987).*

(Continued)

*Primary Examiner* — Youngsul Jeong
*Assistant Examiner* — Gabriel E Gitman
(74) *Attorney, Agent, or Firm* — Oliff PLC

(57) ABSTRACT

A thin-film treatment apparatus for treating viscous material, including a housing, having a heatable and/or coolable housing casing, which encloses a rotationally symmetric treatment chamber extending in the axial direction, an inlet port, arranged in an inlet region of the housing, for feeding the material to be treated into the treatment chamber, an outlet port, arranged in an outlet region of the housings, for discharging the material from the treatment chamber, and a coaxially extending, drivable rotor shaft, arranged in the treatment chamber, for producing a material film on the inner face of the housing casing and for conveying the material in the direction from the inlet region toward the outlet region, the rotor shaft including a central rotor shaft body and rotor blades arranged on the circumference thereof, the radially outermost end of which rotor blades is distanced from the inner face of the housing casing.

14 Claims, 8 Drawing Sheets

(51) Int. Cl.
  *F28D 7/16* (2006.01)
  *F28F 27/00* (2006.01)
  *F28D 21/00* (2006.01)

(52) U.S. Cl.
  CPC .. *B01J 2219/00058* (2013.01); *B01J 2219/24* (2013.01); *F28D 2021/0022* (2013.01); *F28D 2021/0064* (2013.01); *F28F 2265/10* (2013.01)

(58) Field of Classification Search
  CPC ..... F28F 27/00; F28F 2265/10; F28D 7/1607; F28D 2021/0022; F28D 2021/0064
  See application file for complete search history.

(56) References Cited

U.S. PATENT DOCUMENTS

| | | | |
|---|---|---|---|
| 4,872,948 A | | 10/1989 | Kinoshita et al. |
| 5,185,060 A | * | 2/1993 | Yamasaki .............. B01D 1/225 159/13.1 |
| 2010/0331162 A1 | * | 12/2010 | Hedberg .................. B01D 1/14 494/10 |

FOREIGN PATENT DOCUMENTS

| | | | | |
|---|---|---|---|---|
| DE | 100 50 997 C1 | | 12/2001 | |
| JP | S-57-81802 A | | 5/1982 | |
| JP | S5781802 A | * | 5/1982 | ............. B01D 1/225 |
| JP | A_1987262701 | * | 11/1987 | ............... B01D 1/22 |
| JP | A_1995185201 | * | 7/1995 | ............... B01D 1/22 |
| WO | 2004/041420 A1 | | 5/2004 | |

OTHER PUBLICATIONS

Lee, Yung-Li Pan,. (2005). Fatigue Testing and Analysis—Theory and Practice—1.14.1 Slip Ring Assemblies. Elsevier. (Year: 2005).*
JPS5781802A English translation furnished by Applicant (Year: 1982).*
LCI Corp. (2016). Thin Film/Wiped Film Evaporator. LCI Corp. Charlotte, NC. Accessed Aug. 29, 2019 at https://lcicorp.com/thin_film_evaporation/thin_film_wiped_film_evaporator (Year: 2016).*
JPA_1995185201_ENG (J Pat Plat machine translation of Ikegami) (Year: 1995).*
Apr. 12, 2017 Office Action issued in European Patent Application No. EP 16 197 654.3.
Komori et al., "The Effects of Multiple Inclined Blades on Flow and Mixing Characteristics in an Agitated Thin-Film Evaporator," Journal of Chemical Engineering of Japan, vol. 23, No. 5, Oct. 23, 1990, pp. 550-555.

* cited by examiner

THIN-FILM TREATMENT APPARATUS

The invention relates to a thin-film treatment apparatus for treating viscous material.

Thin-film treatment apparatuses have already been known for some considerable time to the person skilled in the art and are used, for instance, in the distillation, concentration, devolatilization and drying of viscous material. Furthermore, thin-film treatment apparatuses are also used for mixing and for reactions in which, at least temporarily, a viscous state obtains, in particular, for instance, for polymerization reactions. The operation of thin-film treatment apparatuses is predominantly realized continuously.

A subgroup of thin-film treatment apparatuses is constituted by thin-film evaporators. These are based on the principle that, by distributing material in a thin film on the inner face of a temperature-controllable housing wall, a high heat flow density can be obtained, whereby ultimately a large evaporative capacity and high evaporation ratios can be enabled in a single pass.

For the distribution of the material, rotors fitted with wiper elements can in particular be provided; appropriate thin-film evaporators which are additionally equipped with a material conveying facility are known to the person skilled in the art, under the designation Filmtruder.

A thin-film processing apparatus in the form of a Filmtruder is described, for instance, in CH 523 087, according to which in a heatable and/or coolable treatment chamber is coaxially arranged a drivable rotor, which has a tubular body, on the circumference of which inclined vanes are evenly distributed and on which, moreover, wiper blades which reach axially into the vicinity of the inner face of the housing casing or touch the inner face are arranged. During operation, the material to be treated is grabbed by the wiper blades which have been set in rotation and distributed in a thin film on the inner wall of the housing, while the obliquely positioned vane parts impart to the detected material a movement component which is directed toward the outlet.

DE 100 50 997 C1 describes a further thin-film evaporator. Here, a shaft, provided with scraper elements, for distributing the introduced substances on the inner side of the housing is arranged in a heating chamber, wherein the shaft has a bearing journal which is slidingly mounted in a bearing bush.

In addition to the, during operation, usually vertically oriented thin-film evaporators, further thin-film processing apparatuses are known to the person skilled in the art, such as, for instance, thin-film dryers, which are generally horizontally oriented. An appropriate thin-film dryer is described in DE 41 17 630, according to which, within a heat exchanger tube is respectively arranged an elongated vaned rotor, which conveys the material to be dried to the inner circumferential surface of the heat exchanger tube. Furthermore, in WO 2004/041420 is disclosed a thin-film treatment apparatus in the form of a horizontally arranged mixing apparatus, in which the components to be mixed are distributed in a thin film on the inner wall of a hollow-cylindrical body, wherein the components are mixed together by interaction of the rotor blades with the inner wall of the hollow-cylindrical body.

As mentioned, thin-film treatment apparatuses designed for the treatment of viscous material. Specifically in the case of temperature-sensitive materials, the problem in this regard arises, however, that, due to the relatively high viscosity, a relatively high quantity of dissipation energy is introduced into the material by means of the rotor shaft. Together with the heat introduced via the housing casing, this can lead to a situation in which the thermal load can become too high and hence the material can suffer damage. In the interest of a high material throughput, the process heat should contrastingly, however, be kept as high as possible. In the case of a thin-film evaporator, for instance, the process heat should thus be kept as high as possible in order to ensure a highest possible evaporative capacity. Moreover, as a result of the high process heat, a large diffusion coefficient should be obtained in order to promote the transport of substances.

The object to be achieved according to the invention thus lies in providing a thin-film treatment apparatus which enables an optimized process management.

In particular, by means of the thin-film treatment apparatus, the process heat should be kept as high as possible, while, at the same time, an overheating of the material to be treated can be reliably prevented. Moreover, by means of the thin-film treatment apparatus, impending process disturbances can be detected early in order to take corrective action and in this way optimize the process management.

The object is achieved by the thin-film treatment apparatus according to the independent claim 1. Preferred embodiments are depicted in the dependent claims.

According to claim 1, the thin-film treatment apparatus according to the invention is designed for the treatment of viscous material and comprises a housing having a heatable and/or coolable housing casing, which encloses a rotationally symmetric treatment chamber extending in the axial direction. The treatment chamber thus corresponds to the housing interior, in which the material is subjected to the appropriate treatment, thus, in particular, the distillation, concentration, degasification, drying and/or reaction of substance components contained in the material. Said treatment chamber is generally of cylindrical design, though it can conceivably or preferredly be designed conically tapered in the outlet-side end region.

The thin-film treatment apparatus further comprises an inlet port, arranged in an inlet region of the housing, for feeding the material to be treated into the treatment chamber, and an outlet port, arranged in an outlet region of the housing, for discharging the material from the treatment chamber. Generally, for the discharge in the outlet-side end region of the housing, a discharge pump is arranged, preferably a gear pump.

In the treatment chamber of the thin-film treatment apparatus is arranged a coaxially extending, drivable rotor shaft for producing a material film on the inner face of the housing casing and for conveying the material in the direction away from the inlet region toward the outlet region, the rotor shaft comprising a central rotor shaft body and rotor blades arranged on the circumference thereof, the radially outermost end of which rotor blades is distanced from the inner face of the housing casing.

According to the invention, in the treatment chamber is arranged at least one temperature sensor for measuring the temperature of the material film.

As is described below in connection with the corresponding method, the thin-film treatment apparatus according to the invention thus allows the temperature of the material film to be determined locally and, on the basis of the specific temperature or the specific temperature profile, allows at least one process parameter to be adjusted. In particular, the temperature control of the housing casing can be purposefully regulated in order to set the process heat locally to the desired value, which, in the case of a thin-film evaporation, is typically high enough to ensure a high evaporative capacity and low enough not to exceed a critical temperature from which a thermally induced damaging of the material to be treated can occur.

For the setting of the desired process heat, the housing casing can be heated or cooled by means of a preheated heat carrier medium. Alternatively or additionally, the setting of the process heat can also be regulated via the geometry and/or the rotational speed of the rotor shaft.

Ultimately, the present invention thus allows a stable and reproducible operation to be ensured and the production of high-quality products to be enabled.

As mentioned, the thin-film treatment apparatus is designed in particular for the treatment of viscous material. By "viscous material" is understood, within the meaning of the present invention, typically a material having a viscosity within the range from 1 to 50,000 Pa·s, in particular from 50 to 15,000 Pa·s. Preferably, the material to be treated according to the invention has at least temporarily a viscosity of more than 100 Pa·s, more preferredly more than 500 Pa·s, most preferredly more than 1000 Pa·s, since, from this viscosity level, the dissipation phenomena strongly increase and the advantages of the invention are manifested particularly strongly. The viscosity can be determined, for example, with a rotational viscosimeter according to DIN ISO 1652:2013-02, at the respective temperature of the material.

Of course, in the present invention, thin-film treatment apparatuses in which the material to be treated is present only periodically in the viscous state are jointly included. Thus thin-film treatment apparatuses in which the material transforms into a solid, granulable or free-flowing state during the treatment are also embraced.

Preferably, the thin-film treatment apparatus is designed for the thermal separation of a substance mixture and is present, in particular, in the form of a thin-film evaporator, a thin-film dryer or a thin-film reactor. Typically, the thin-film treatment apparatus or the thin-film evaporator, thin-film dryer or thin-film reactor has a vapor port, through which the separated highly volatile substance components can be drawn off from the treatment chamber.

As stated below, depending on the material and depending on the specific type of treatment of the material, different temperature patterns obtain in the thin-film evaporator. Thus, on the one hand, processes are conceivable in which the temperature maximum obtains directly before the material outlet of the thin-film evaporator, while, on the other hand, processes are conceivable in which the temperature, after the material inlet, momentarily increases, but from a certain point decreases again toward the material outlet, as can happen, for instance, in processes in which a flash evaporation or a phase change is present.

In order to determine the temperature pattern with sufficiently accuracy, according to a particularly preferred embodiment a plurality of, i.e. two or more, temperature sensors are present, which are arranged distributed over the length of the treatment chamber, i.e. over the path to be covered by the material in the axial direction.

According to a particularly preferred embodiment, at least some of the temperature sensors are arranged on the rotor shaft, preferably on the central rotor shaft body. Compared to an arrangement of the temperature sensor on the housing casing, this embodiment has the advantage that the determination of the temperature is decoupled from the heat radiation of the housing casing, which heat radiation could falsify the temperature determination of the material film. Thus, according to this embodiment, the temperature of the material film or those temperature differences of the material film which exist between individual zones can be very accurately determined, which ultimately allows an optimal regulation of the process proceeding in the treatment apparatus. Moreover, this embodiment has the advantage that no equipment modifications must be made to the housing casing. In particular, no recesses have to be formed on the inner face of the housing casing wall, as would be necessary, for instance, when the temperature sensors are arranged on the housing casing wall and must thus be set back from the inner face in order to ensure a uniform inner face. Moreover, according to the above preferred embodiment, the temperature sensors do not have to be fed through the space which is flowed through by the heat carrier medium and in which also the temperature sensor holder would thus be circumflowed by heat carrier medium.

It is here further preferred that at least some of the temperature sensors are arranged in a region of the rotor shaft at which, during operation of the thin-film treatment apparatus, they are in direct contact with the material film. According to a particularly preferred embodiment, at least some of the temperature sensors are arranged on the rotor shaft such that that temperature-sensing portion of the temperature sensor which taps the temperature is arranged in the region of the radially outermost end of the rotor shaft in order to ensure a permanent material contact of the temperature sensors. The radially outermost end is here generally distanced by 0.5 mm to 12 mm, preferably by 1 mm to 4 mm, from the inner face of the housing casing. In particular, an arrangement with which the temperature can be tapped in the bow wave of the material film, which bow wave is formed before a rotor blade, is conceivable. According to a particularly preferred embodiment, the temperature-sensing portion of the temperature sensor is thus arranged on the bow side of a rotor blade, i.e. on the region which, viewed in the direction of rotation, lies downstream.

The above embodiment, according to which at least some of the temperature sensors are in direct contact with the material film during operation of the thin-film treatment apparatus, comprises embodiments in which this direct contact does not exist continuously. In this context, it should be noted that the above embodiment is of particular advantage specifically for the treatment of materials which, during the treatment, transform into a free-flowing state. For these materials, in the generally horizontally oriented thin-film treatment apparatus, a continuous wetting of the inner face can be achieved only at high Froude numbers, such as, for example, 40 or higher. By means of the temperature sensors, which are in direct contact with the material film during operation of the thin-film treatment apparatus, an indication can thus also be given concerning the wetting of the inner face.

By the term "rotor blade", as is used in connection with the present invention, both wiper blades, as are described, for instance, in CH 523 087 and the primary function of which is to produce a material film, and conveyor blades, which have the primary function of imparting to the material a movement component directed toward the discharge port, are embraced. To this end, a plurality of conveyor blades arranged offset by 5° to 90°, more preferredly by 20° to 90°, are generally provided, which conveyor blades respectively have an axially extending rotor blade and obliquely arranged vane parts disposed on the radial outer rim of the rotor blade. By the term "rotor blade" are in particular embraced, however, also wiper blade elements which are arranged successively in the axial direction. Typically, a number of axially running rows of wiper blade elements are here arranged mutually offset, for example by 90°, in the circumferential direction.

According to a particularly preferred embodiment, at least some of the rotor blades are present in the form of wiper blade elements, which, at least in their marginal region facing the inner face of the housing casings, form a setting angle in relation to the rotor axis. These wiper blade elements are thus designed in such a way as to produce a material film on the inner face of the housing casing wall and to at the same time impart to the material a movement component toward the discharge port. As mentioned, it is particularly preferred that the temperature of the bow wave of the material film is tapped, and the temperature-sensing portion of the temperature sensor is preferably arranged, on the bow side of the wiper blade element, as is described in detail, moreover, in connection with the figures. In this respect, it is further preferred that a temperature sensor element arranged on the rotor shaft body, with a portion running radially to the rotor shaft body, is fed through a wiper blade element located at appropriate height, in order that the temperature-sensing portion of the temperature sensor ends up on the bow side of the wiper blade element, as is likewise stated within the description of the figures.

However, it is also conceivable that the temperature sensors are present in the form of contactlessly measuring temperature sensors. This can in particular be advantageous when direct contact of the temperature sensors with the material film should be avoided.

More specifically, the temperature sensor can thus be present as a thermoresistive temperature sensor, thermocouple, pyrometer and/or infrared sensor. Since, as mentioned, the temperature sensor is preferably arranged on the rotor shaft and is not fed through the heated housing casing, an insulation of the temperature-sensing portion from disturbing heat radiation or heat radiation which falsifies the measurement result is not necessary to ensure an accurate measurement. Thus, according to this embodiment, very accurate measurement results can be obtained even with simple, and thus inexpensive, temperature sensors.

To the at least one temperature sensor is generally assigned a signal line for conducting to an external signal processing apparatus the signal determined with the temperature sensor. With this signal line, which is present, for instance, in the form of a cable, the signal is thus conducted outward from the treatment chamber, where it can be evaluated and whence, on the basis of the evaluation, the necessary adjustments can be made.

With respect to the above-described preferred embodiment, in which at least some of the temperature sensors are arranged on the rotor shaft, it is further preferred that the signal line is at least partially fed through an axially extending signal line duct in the rotor shaft body. Thus the arrangement of the temperature sensors on the rotor shaft allows equipment modifications of the housing to be dispensed with. In particular, no recesses have to be provided in the housing wall, which recesses are necessary, for instance, if the signal line is fed through the housing wall.

It is conceivable, for instance, that the signal conducted through the rotor shaft body is fed to a slip ring arrangement, arranged outside the treatment chamber, on the rotor shaft, is tapped there and—generally via an amplifier—is fed to an evaluation unit.

Furthermore, it is conceivable that—in addition to the signal line duct—in the rotor shaft body is provided a further axially extending duct for the introduction of a substance, in particular an entrainer. Said entrainer is preferably used for stripping purposes; more specifically, this can be constituted by an inert gas, such as, for example, nitrogen. This additional duct generally runs parallel to the signal line duct.

According to this embodiment, an introduction of the entrainer through the heated housing casing wall is not necessary; an impairment of the material conveying system, as can be obtained if substances are fed through the housing casing wall, can thus be avoided according to this embodiment.

As mentioned, the housing casing is designed to be heatable and/or coolable. To this end, inside the housing casing is generally formed a housing casing cavity, which is intended to be flowed through by a heat carrier medium for heating and/or cooling purposes. In this respect, it is preferred that the housing casing wall is of double-walled design and the interspace between housing casing inner wall and housing casing outer wall is intended to be flowed through by the heat carrier medium. Preferably, for this purpose, a guide spiral for the conductance of the heat carrier medium is arranged in the cavity, since a very high heating or cooling capacity can thereby be obtained.

In order to be able to purposefully affect the local process heat in the thin-film treatment apparatus, it is further preferred that the housing casing comprises at least two housing casing segments, which are designed so as to be heated and/or cooled independently of one another. According to this embodiment, to each housing casing segment are preferably respectively assigned a separate heat carrier circuit system with separate heat carrier inlet and separate heat carrier outlet.

It is here further preferred that the housing casing segments respectively enclose a corresponding treatment chamber zone, and the temperature sensors are distributed amongst different treatment chamber zones. Ideally, the treatment chamber is thus previously divided, with a view to the arrangement of the temperature sensor and the housing casing segments, into different treatment chamber zones, in which, in comparison to the preceding treatment chamber zone, a relatively marked change in the composition or viscosity of the material is expected. Particularly preferredly, in those treatment chamber zones in which, due to the expected rise in viscosity, a relatively high input of dissipation energy is also expected, a plurality of temperature sensors are arranged, in order, specifically in these treatment chamber zones, to monitor the temperature in relatively high resolution and ultimately to reliably avoid a situation in which a critical temperature is exceeded. This is the case, in particular, in the outlet-side end region of the treatment chamber. Of course, as a result of the high-resolution temperature monitoring which is enabled according to the invention, a situation in which a critical temperature is fallen below can also be avoided where this might arise.

According to another preferred embodiment, at least in one of those regions of the thin-film treatment apparatus in which a temperature sensor is arranged, a heat carrier temperature sensor is arranged in the corresponding region of the housing casing. This heat carrier temperature sensor here projects with its temperature-sensing portion into the housing casing cavity, or into the guide spiral arranged therein, and is intended to determine the locally obtaining temperature of the heat carrier medium, to be precise at least approximately at that height at which the corresponding temperature sensor is arranged in the treatment chamber. As a result, the temperature control of the housing casing can be regulated still more precisely and more rapidly than if the temperature of the heat carrier medium is determined merely upon exit from the corresponding housing casing segment.

As mentioned, the thin-film treatment apparatus according to the invention can thus be used particularly advantageously for a method for the optimized guidance of a process proceeding in the thin-film treatment apparatus.

According to this method, the material to be treated is fed via the inlet port into the treatment chamber, by means of the rotor shaft a material film is produced on the inner face of the housing casing and the material is conveyed in the direction toward the outlet region.

The temperature of the material film is here determined at at least one place in the thin-film treatment apparatus, the thus determined value is compared with a desired value and, in dependence on the variance from the desired value, at least one process parameter is regulated.

As a process parameter, according to one specific embodiment, that quantity of heat which is to be introduced into the material or removed at the appropriate place is regulated.

Preferably, that quantity of heat which is to be introduced into the material or is to be removed is regulated at least partially via that quantity of heat which is to be introduced into the housing casing or is to be removed. This is preferably realized via regulation of the temperature of the heat carrier medium which is used to heat or cool the housing casing wall.

Alternatively or additionally thereto, that quantity of heat which is to be introduced into the material can be regulated via the rotational speed of the rotor shaft, since, with an increase in the rotational speed, the dissipation heat too increases, as has been described above. Furthermore, it is conceivable, to adjust the dissipation energy input via the geometry of the rotor shaft. In this respect, it is in particular conceivable, in those regions in which the material has a high viscosity, to reduce the number of rotor blade elements, or the shearing forces exerted by these, in those regions in which the material has a lower viscosity.

In a polymerization process or the accompanying separation of excess monomer, the regulation of the process parameter or parameters is realized specifically, with due regard to the following applicable operative relationships:

Thus the viscosity of the polymer material rises if
the molecular weight of the material increases,
the temperature of the material decreases,
the content of volatile components decreases, and/or
the shearing rate decreases.

With rising viscosity, the dissipation energy also increases. Furthermore, the dissipation energy rises if the rotation speed of the rotor shaft is increased.

In the case of low-viscosity material, i.e. in an initial phase for example of a degasification or of a polycondensation, the process heat is thus determined predominantly by heat conduction from the housing casing to the material, while, in the case of high-viscosity material, i.e. in advanced degasification or polycondensation, the heat energy introduced by dissipation is predominant. Depending on the material and depending on the treatment, this leads to different temperature patterns in the thin-film evaporator. Thus it is on the one hand conceivable that, in the case of a first material, the temperature maximum is obtained no sooner than in the region of the material outlet, which is the case, for instance, in polycondensation processes or radical or ionic polymerization processes, in which the viscosity is determined predominantly via the molecular weight (rising during the process) and which, moreover, generally proceed exothermically. On the other hand, it is also conceivable, however, that the temperature momentarily increases after the material inlet, but from a certain point, toward the material outlet, decreases again. This can arise, for instance, when the rise in viscosity as a result of decreasing content of volatile components is more pronounced than the reduction in viscosity as a result of heating.

Due to the fact that the thin-film evaporator according to the invention enables a very gentle treatment, it is specifically particularly well suited for polymerization, in particular for polycondensation or radical or ionic polymerization. Problems which can here arise, that a critical temperature of the polymer is exceeded, can thus be effectively avoided according to the invention. More specifically, the present invention thus allows a discoloration of the polymer, an unwanted gelling and the formation of black specks to be reliably circumvented.

Since radical or ionic, in particular anionic, polymerization processes generally proceed in a particularly strongly exothermic manner, the suitability of the thin-film evaporator according to the invention for these polymerization processes is particularly high. In these polymerization processes, the exothermic reaction is generally in the initial phase particularly high, this being followed, due to the achieved higher conversion, by a phase in which a relatively high heat input is realized by dissipation. Specifically the above-described embodiment, in which at least some of the temperature sensors are in direct contact with the material film during operation of the thin-film treatment apparatus, is particularly advantageous for these processes since a rapid temperature regulation or temperature control is of particular interest, whether by means of cooling via the housing wall or by addition of distillate and/or other cooling liquids.

The advantages according to the invention are of importance in particular in the production or treatment of biologically degradable substances, and especially of polymers based on renewable raw materials. A further category of substances for which the thin-film evaporator according to the invention is particularly advantageous relates to adhesives, sealants and/or coating materials, in particular of the kind which harden in an UV-induced, heat-induced and/or pressure-activated manner.

Thus the above-described method can be used, for instance, in polymerization processes for the separation of excess monomers. Ideally, the thus separated highly volatile monomer is prepared and refed into the polymerization process proceeding in the treatment chamber.

The invention is further illustrated on the basis of the appended figures, in which.

Figure 1:
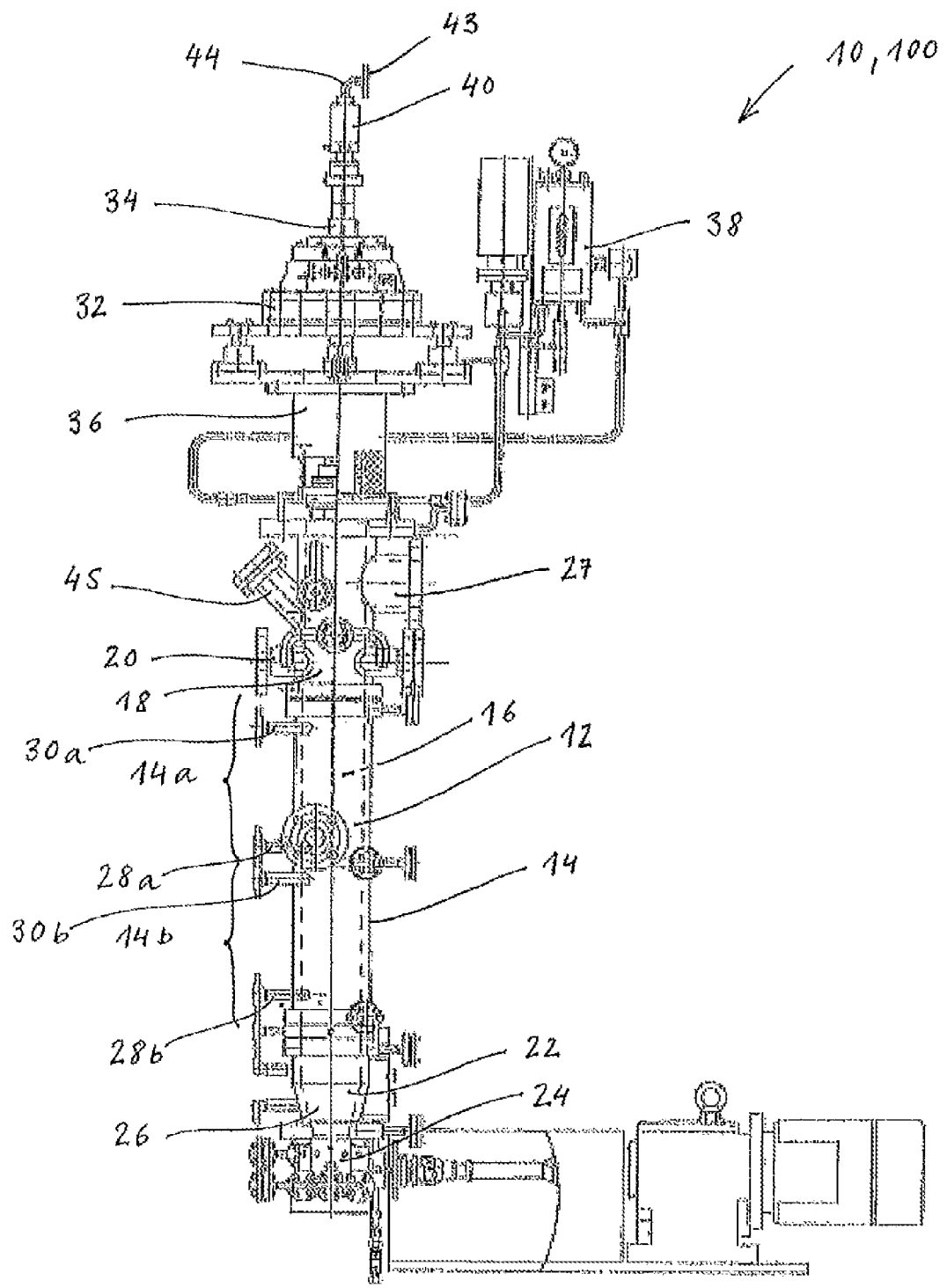
FIG. 1 shows a schematic representation of a thin-film treatment apparatus according to the invention in the form of a thin-film evaporator.

The thin-film treatment apparatus 10 shown in FIG. 1, in the form of a thin-film evaporator 100, has a housing 12 having a housing casing 14, which latter encloses a treatment chamber 16 extending in the axial direction. In an upper inlet region 18 of the housing 12 is arranged an inlet port 20 for feeding the material into the treatment chamber 16, while in a lower outlet region 22 of the housing 12 is arranged an outlet port 24 for discharging the material from the treatment chamber 16.

The housing casing 14 is on the inlet side cylindrically formed; correspondingly, the treatment chamber 16 enclosed by the housing casing 14 also has in this region a cylindrical form. On the outlet side, the housing casing 14 tapers conically toward the outlet, wherein at the outlet of the thereby formed discharge cone 26 is arranged a discharge pump.

Moreover, in the housing casing is arranged a vapor port 27, via which highly volatile components can be drawn off from the treatment chamber 16.

The housing casing 14 is of double-walled configuration, thus has a housing casing inner wall and a housing casing outer wall with an intervening interspace, in which is arranged a guide spiral for the conductance of a heat carrier medium, typically a heat transfer oil or thermal oil. In the shown embodiment, two housing casing segments 14a, 14b are present, to which are respectively assigned a separate heat carrier circuit having respectively a heat carrier inlet 28a, 28b, fluidically connected to the corresponding guide spiral, and a heat carrier outlet 30a, 30b, and which are thus temperature-controllable independently of each other. To this end, to the respective heat carrier circuit is assigned, moreover, a separate heating element and cooling element for controlling the temperature of the heat carrier medium, whence, by means of a heat carrier pump, it is fed via the heat carrier inlet 28a or 28b into the cavity formed in the housing casing wall or into the guide spiral.

Upstream of the inlet port 20 can be placed, moreover, a mixing apparatus (not shown), such as, for instance, a static mixer. By means of this, further components, such as, for example, deactivators, additives, stabilizers, or mixtures and combinations thereof, can be added to the material to be treated.

Figure 2:
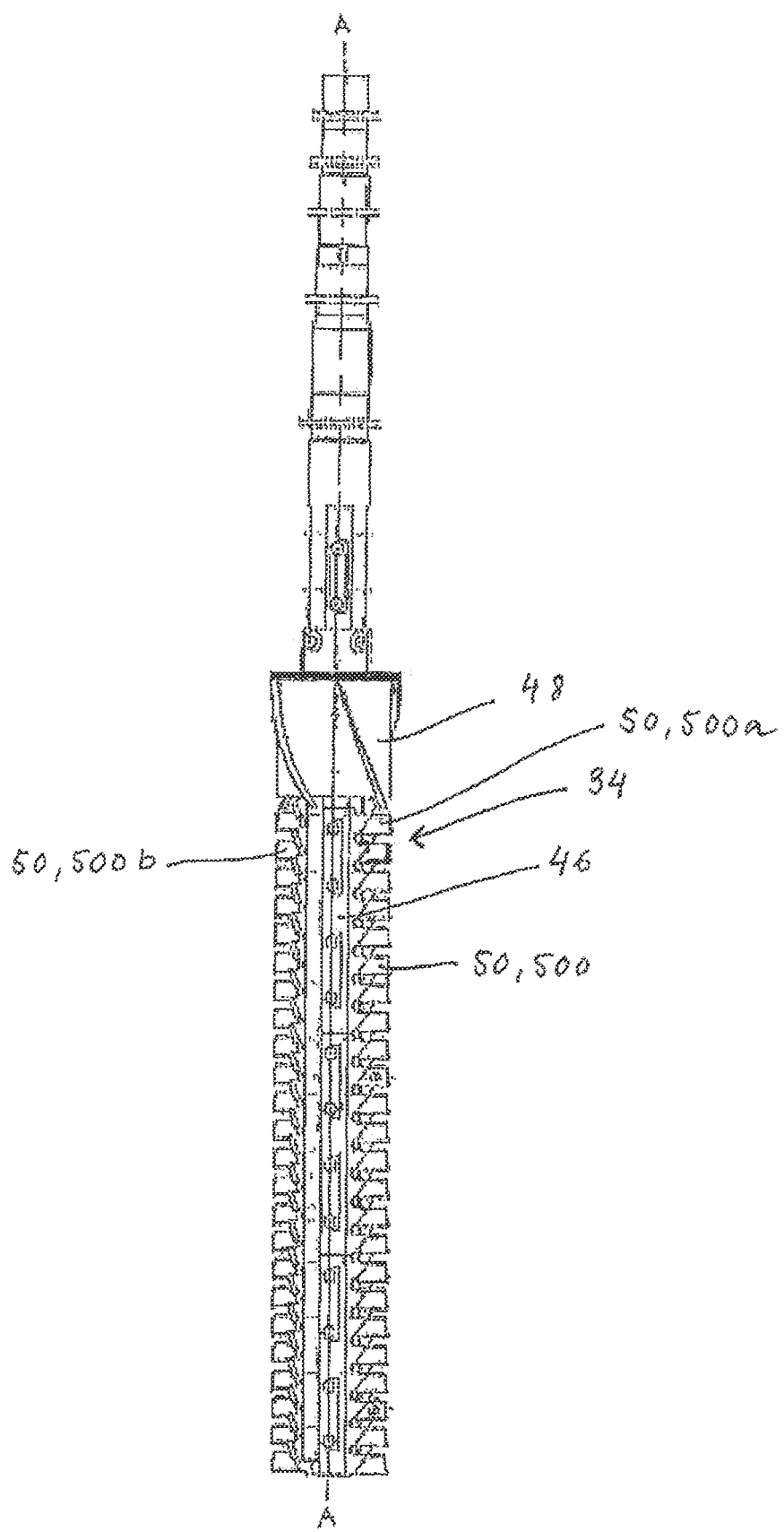
FIG. 2 shows a side view of a rotor shaft of the thin-film treatment apparatus shown in FIG. 1.
Figure 3:
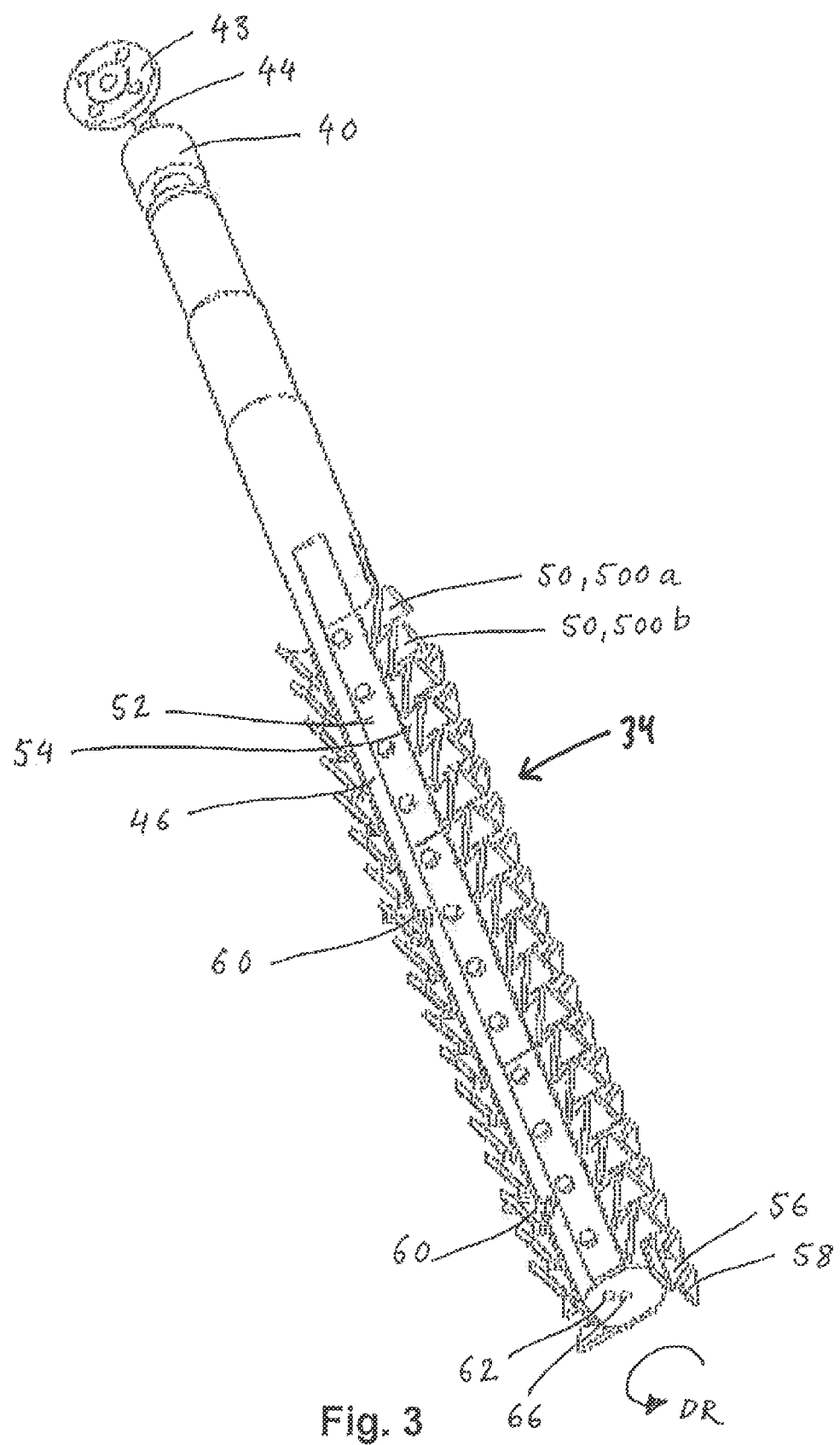
FIG. 3 shows a perspective view of a part of the rotor shaft shown in FIG. 2.
Figure 4:
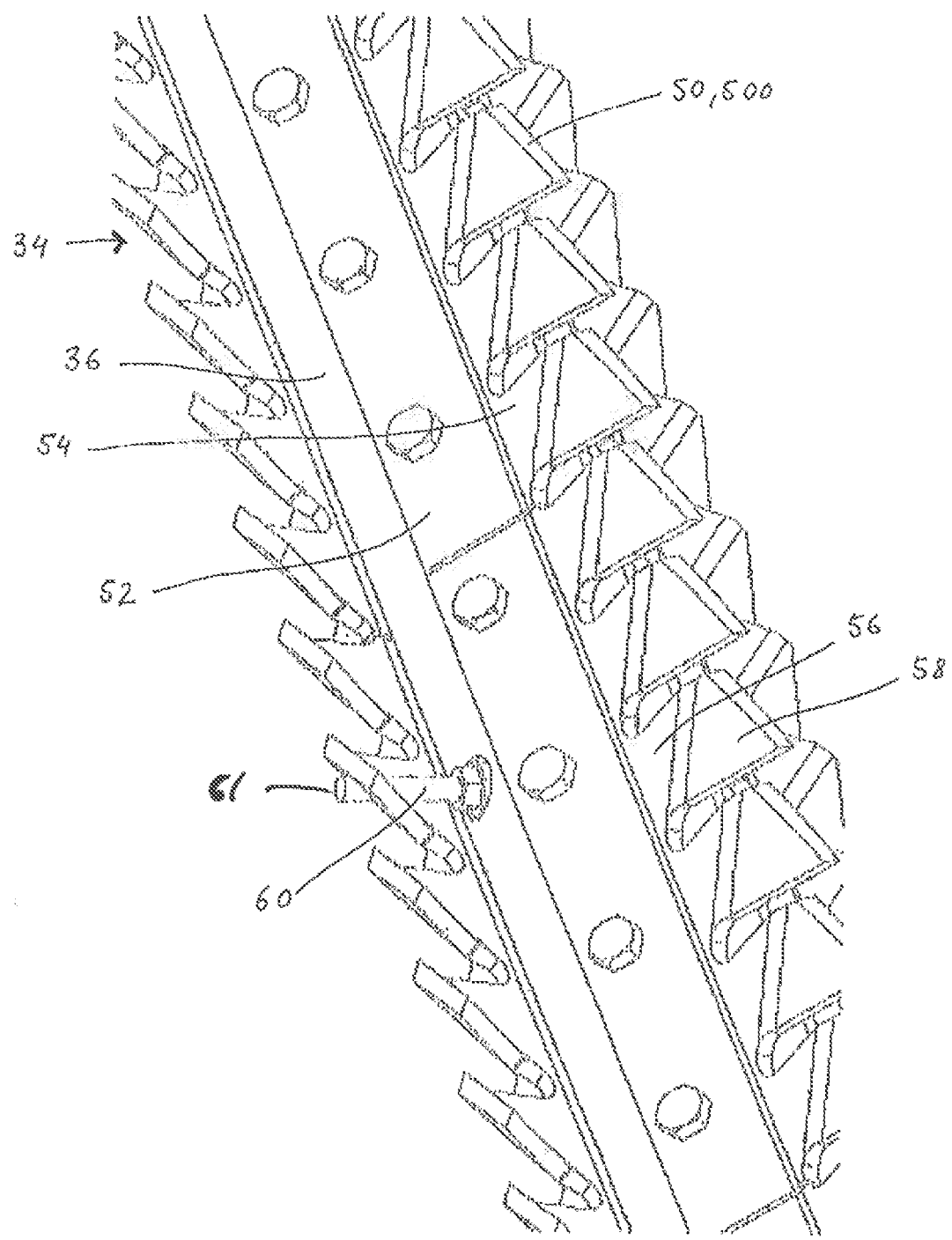
FIG. 4 shows a detailed view of a temperature sensor arranged on the rotor shaft according to FIG. 3.
Figure 5:
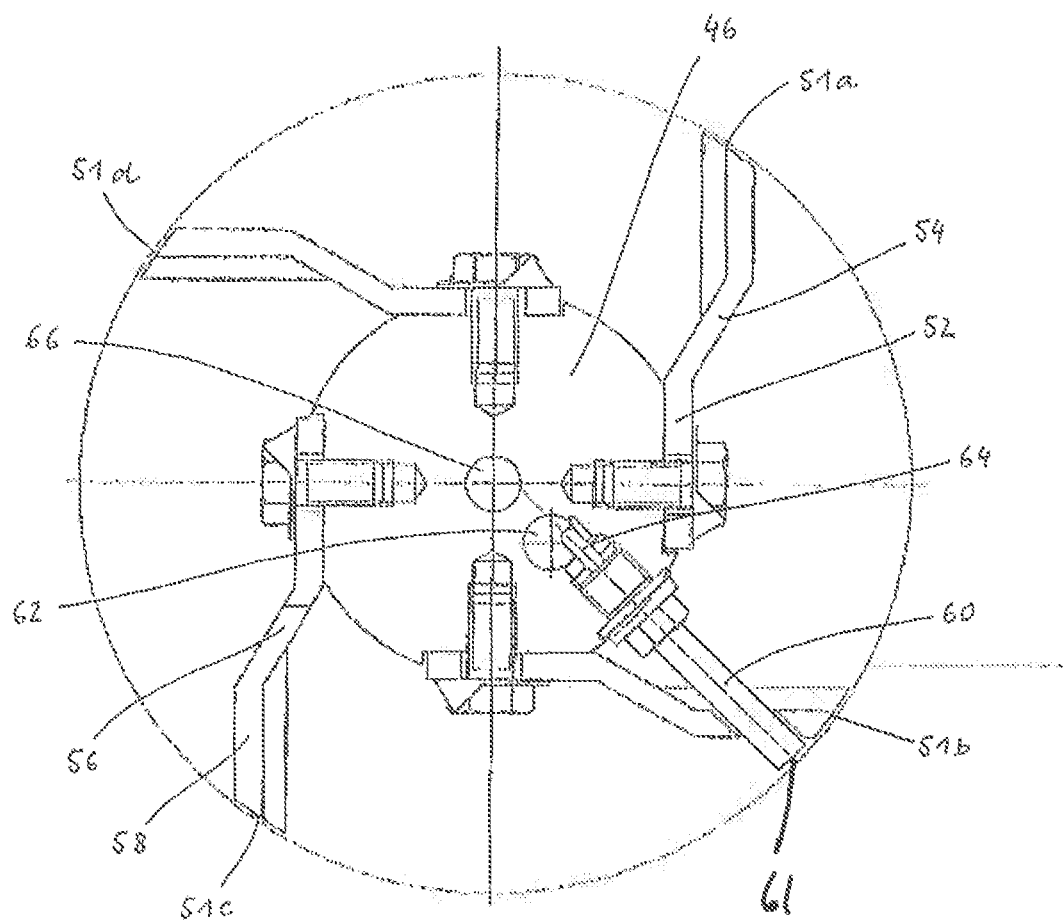
FIG. 5 shows the rotor shaft shown in FIG. 3, in cross section.

As is further stated in connection with FIG. 2, in the treatment chamber 16 is arranged a coaxially extending rotor shaft 34, drivable by means of a hydraulic drive 32, for producing a material film on the inner face of the housing casing 14 and for conveying the material in the direction away from the inlet region 18 toward the outlet region 22. In addition to the shown hydraulic drive, electric drives are also conceivable for this purpose.

In the shown embodiment, the rotor shaft is fed through the hydraulic drive 32. Between hydraulic drive 32 and the housing casing 14 enclosing the treatment chamber 16 is arranged a lubrication feed 36, which, for the lubrication of axial face seals, is connected to an auxiliary unit 38.

Figure 7:
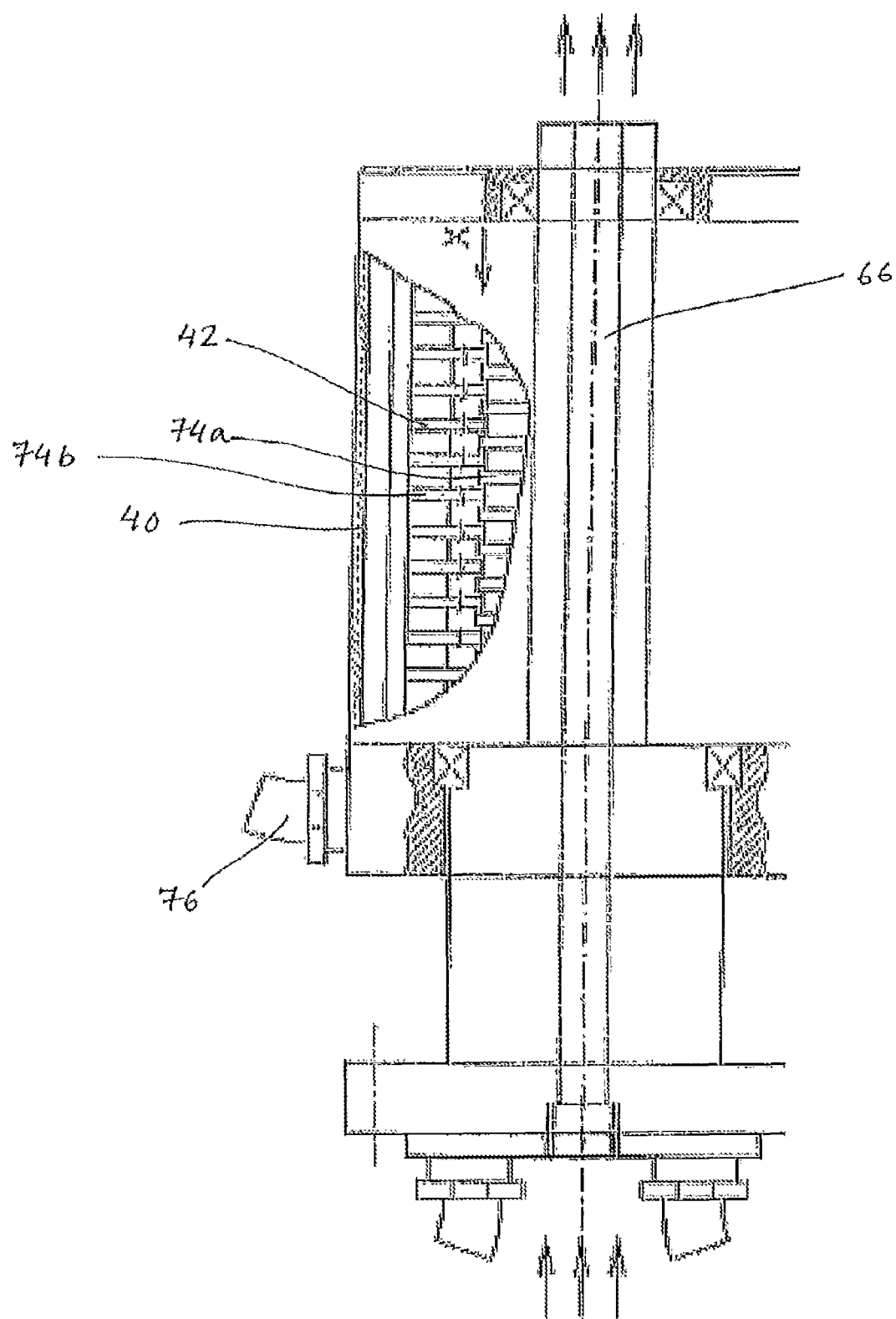
FIG. 7 shows a schematic representation of the slip ring rotor arrangement assigned to the rotor shaft.

On that side of the hydraulic drive 32 which is facing away from the housing 12, the rotor shaft 34 is mounted in a stator bush 40, which comprises a slip ring arrangement 42 that is elaborated upon in connection with FIG. 7. At the uppermost end is arranged, moreover, an entrainer feed line 44 for the introduction of an entrainer.

Moreover, in the housing casing 14 is incorporated an inspection glass 45, which is intended to allow an inspection to be made of the inside of the housing or of the treatment chamber.

As is shown, for instance, in FIG. 2, the rotor shaft 34 comprises a central rotor shaft body 46, which in the shown embodiment is configured as a rod, specifically for relatively large dimensions, but which can also be present in the form of a tube.

In that region of the rotor shaft 34 which, in the mounted state of the thin-film evaporator 100, lies in the region of the inlet port 20 is arranged a conveying helix 48 having a relatively large pitch. In the direction of conveyance, this is followed by rows 51 of rotor blades 50 running substantially parallel to the axial direction, which rotor blades are arranged on the circumference of the rotor shaft body 46 in the form of wiper blade elements 500, which reach to close to the housing casing inner wall. In the shown embodiment are formed four such rows 51a, 51b, 51c, 51d, which are spaced apart by respectively 90° in the circumferential direction.

The wiper blade elements 500 are directed obliquely away from the direction of rotation (DR). More specifically, according to the embodiment shown in FIG. 2, a plurality of wiper blade elements 500 following one upon the other in the axial direction are formed by teeth 54, which protrude from a mounting plate 52. These respectively have a proximal segment 56 adjoining the mounting plate, which proximal segment is oriented obliquely to the mounting plate and lies in a plane running parallel to the rotor axis A. These proximal segments 56 are respectively followed by a distal segment 58, which thus forms the radially outer end region of the respective rotor blade 50 or wiper blade element 500 and runs in a plane running obliquely to the rotor axis A; in the shown embodiment, the bottom edge and the top edge of the distal segment 58 run substantially parallel to the plane of the mounting plate 52.

During operation, the material to be treated, which has been fed through the inlet port 20 into the treatment chamber 16, is grabbed by the conveying helix 48 and conveyed in the direction of the wiper blade elements 500. As soon as the material reaches the uppermost wiper blade elements 500a, it is pushed ahead by these and distributed on the housing casing inner wall in a thin film.

As a result of the setting angle formed by the distal segment 58 of the wiper blade elements 500, to the material to be conveyed is imparted a movement component in the direction toward the outlet port 24. As soon as the material pushed ahead by the uppermost wiper blade element 500 reaches the lower edge of the wiper blade element, it stays as a bead on the housing casing inner wall. The following wiper blade elements 500b now, for their part, grab the bead, crush it and push it further in the direction of the outlet port 24 etc., whereby the material is ultimately conveyed over the entire length of the treatment chamber.

On the rotor shaft body 46 are arranged, between the rows of wiper blade elements, temperature sensors 60. These extend substantially radially to the rotor shaft 34 or to the rotor shaft body 46 and are fed through the distal segment 58 of the wiper blade element located at the same height. In such a way, the radially outermost temperature-sensing portion 61 of the temperature sensor, viewed in the direction of rotation, ends up in front of the respective wiper blade element 500, so that, during operation, the temperature-sensing portion 61 is located in the bow wave of the material, which bow wave is produced by the wiper blade element.

Figure 6:
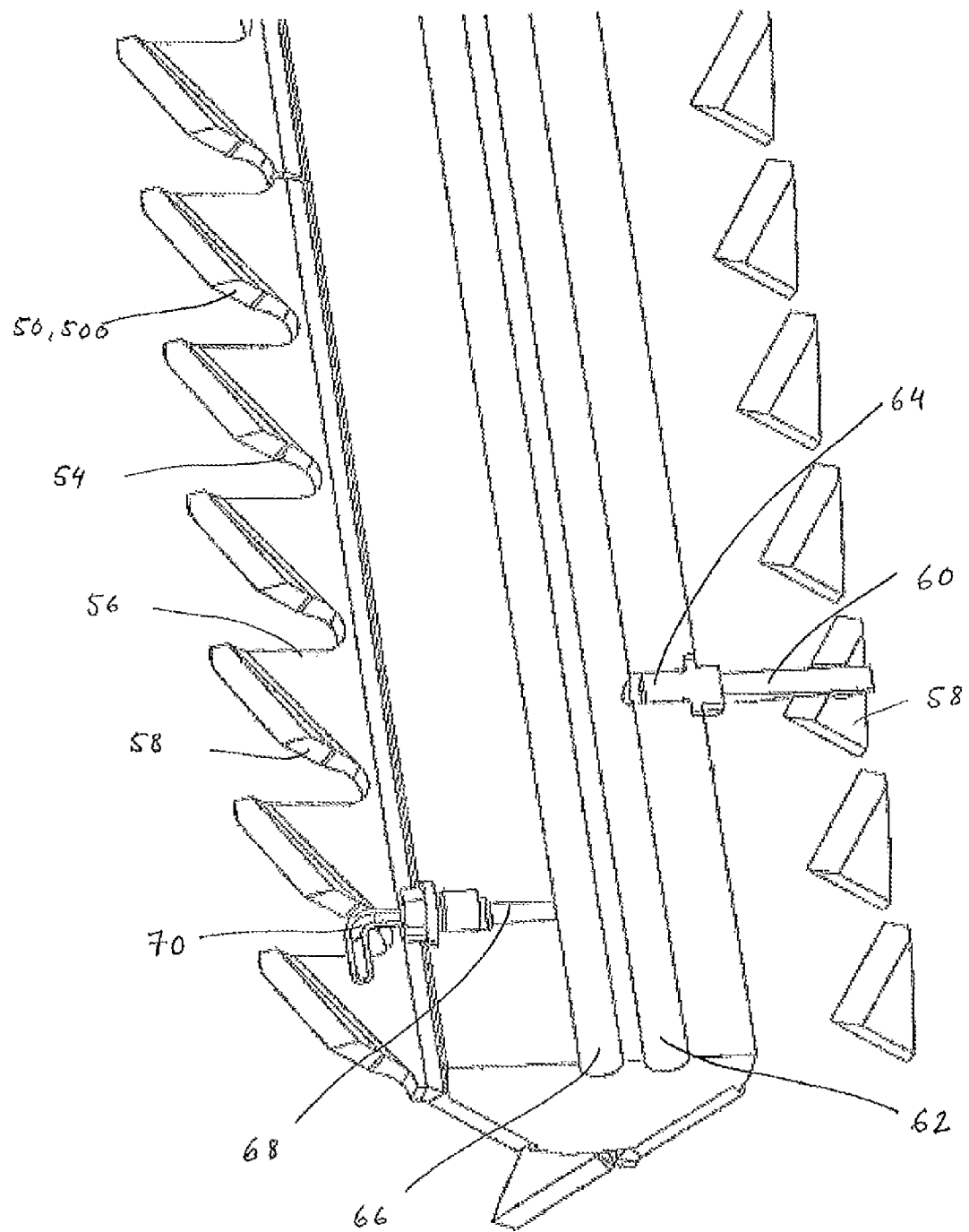
FIG. 6 shows a part of the rotor shaft shown in FIG. 3, in axial longitudinal section.

For the conductance of the signal tapped by the temperature sensor 60, in the rotor shaft body 46 is formed an axially extending signal line duct 62, in which temperature sensor passages 64 provided for this purpose emerge, as can be seen, for instance, from FIG. 6. As can further be seen from FIG. 6, in the rotor shaft body is formed a further axially extending duct 66 for the introduction of an entrainer. From this duct, entrainer discharge openings 68 lead radially through the rotor shaft body 46 into corresponding tubular extensions 70, which are likewise arranged between the rows of wiper blade elements.

Through the signal line duct 62, lines lead to a slip ring arrangement 42 comprising rotating slip rings 74a, assigned to the rotor shaft 34, and stationary slip rings 74b, assigned to the stator bush 40. The signal transmitted by means of the slip ring arrangement 42 is then fed via a cable outlet 76 to an external amplifier and an evaluation system.

The duct 66 for the entrainer extends also through the stator bush 40 and is fluidically connected to an entrainer feed line 44, which possesses a corresponding flange 43.

Due to the local temperature signals determined by the individual temperature sensors 60, a temperature profile which on the one hand allows the temperature control of the housing casing wall to be purposefully adjusted can be created. This can be realized, for instance, by appropriate adjustment of the temperature and of the throughput of the heat carrier medium flowing through the guide spiral.

Figure 8:
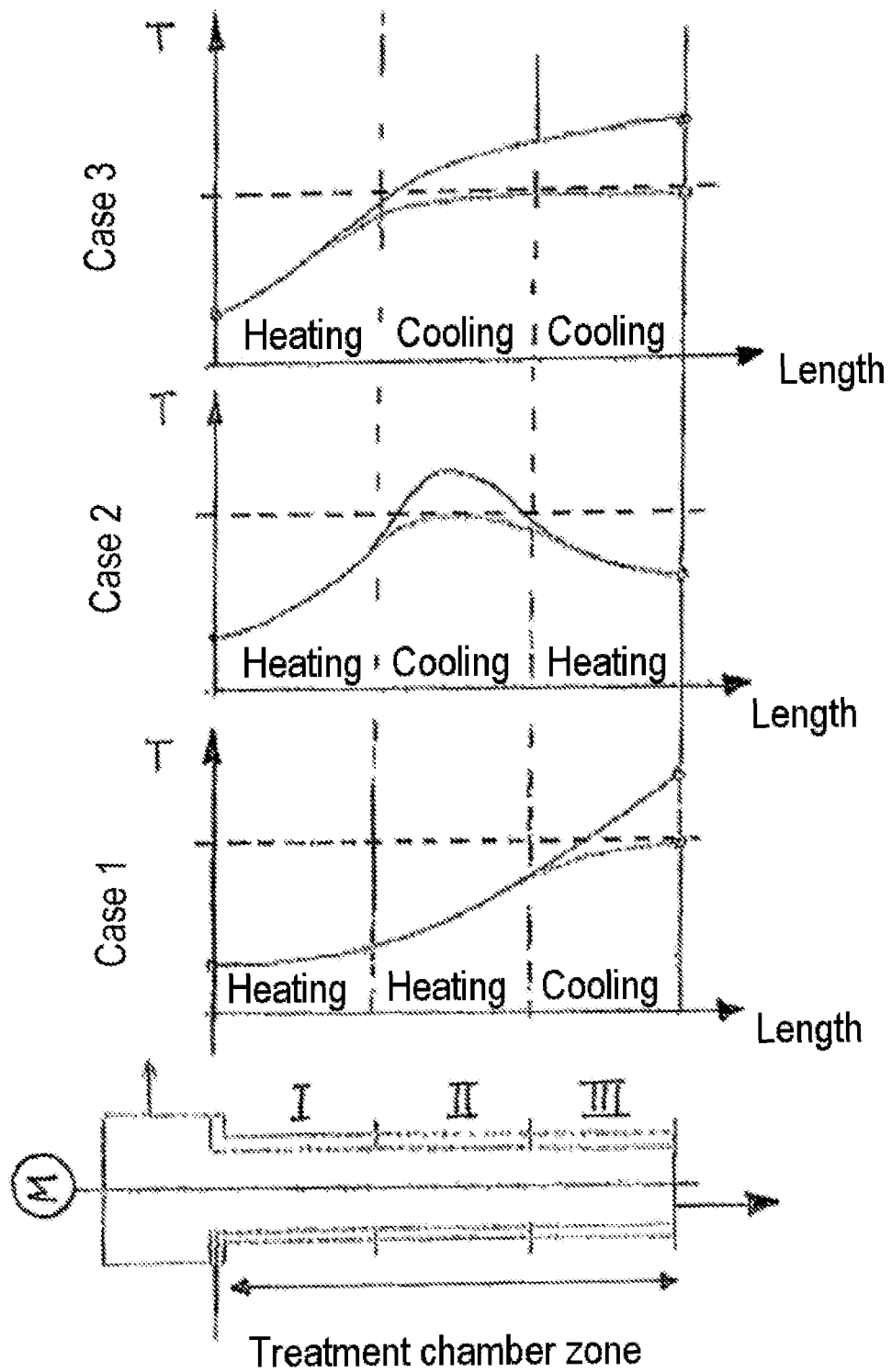
FIG. 8 shows three exemplary temperature patterns, determinable by means of the thin-film treatment apparatus according to the present invention.

Three exemplary temperature patterns, requiring a different management of the temperature control, are shown in FIG. 8. Within the charts depicting the respective temperature pattern, also the corresponding treatment chamber zones of the thin-film evaporator are depicted, wherein a differentiation is made between three zones: an inlet-side treatment chamber zone I, a middle treatment chamber zone II, and an outlet-side treatment chamber zone III. Moreover, in all three cases the maximally admissible limit temperature, above which the product can suffer damage, is depicted.

In cases 1 and 3, the highest temperature is respectively reached in the outlet-side treatment chamber zone III, while in case 2 the temperature maximum is obtained within the middle treatment chamber zone II. Case 2 can arise, for example, when the rise in viscosity as a result of the decreasing content of volatile components is more pronounced than the reduction in viscosity as a result of warming.

By purposeful cooling of the heat carrier medium or appropriate temperature control of the housing casing wall, the temperature of the material can be influenced such that the maximally admissible temperature is not exceeded.

REFERENCE SYMBOL LIST

10; 100 thin-film treatment apparatus; thin-film evaporator
12 housing
14 housing casing
14a, 14b housing casing segments
16 treatment chamber
18 inlet region
20 inlet port
22 outlet region
24 outlet port
26 discharge cone
27 vapor port
28a, b heat carrier inlet
30a, b heat carrier outlet
32 hydraulic drive
34 rotor shaft
36 lubrication feed
38 auxiliary unit
40 stator bush
42 slip ring arrangement
43 flange
44 entrainer feed line
45 inspection glass
46 rotor shaft body
48 conveying helix
50; 500 rotor blade; wiper blade element
52 mounting plate
54 tooth
56 proximal segment
58 distal segment
60 temperature sensors
61 temperature-sensing portion
62 signal line duct
64 temperature sensor passages
66 duct for the introduction of an entrainer
68 entrainer discharge openings
70 tubular extensions
74a rotating slip rings
74b stationary slip rings
76 cable outlet
A rotor axis
DR direction of rotation

The invention claimed is:

1. A thin-film treatment apparatus for treating viscous material, comprising
  a housing having a heatable and/or coolable housing casing, which encloses a rotationally symmetric treatment chamber extending in the axial direction,
  an inlet port, arranged in an inlet region of the housing, for feeding the material to be treated into the treatment chamber,
  an outlet port, arranged in an outlet region of the housing, for discharging the material from the treatment chamber, and
  a coaxially extending, drivable rotor shaft, arranged in the treatment chamber, for producing a material film on the inner face of the housing casing and for conveying the material in the direction away from the inlet region toward the outlet region, the rotor shaft comprising a central rotor shaft body and rotor blades arranged on the circumference of the rotor shaft body, the radially outermost ends of the rotor blades being distanced from the inner face of the housing casing,
  wherein in the treatment chamber is arranged a plurality of temperature sensors for measuring the temperature of the material film, wherein the plurality of temperature sensors are distributed over the length of the treatment chamber, and wherein one or more of the temperature sensors are arranged on the rotor shaft body such that a temperature-sensing portion of each of the one or more temperature sensors is arranged in a region of the radially outermost end of a rotor blade on a bow side of an immediately adjacent rotor blade.

2. The thin-film treatment apparatus as claimed in claim 1, wherein the thin-film treatment apparatus is designed for the thermal separation of a substance mixture and is, in the form of a thin-film evaporator, a thin-film dryer or a thin-film reactor.

3. The thin-film treatment apparatus as claimed in claim 1, wherein each of the plurality of temperature sensors is provided a signal line for conducting to an external signal processing apparatus a temperature signal obtained by each temperature sensor.

4. The thin-film treatment apparatus as claimed in claim 1, wherein one or more of the temperature sensors are arranged such that during the operation of the thin-film treatment apparatus, the one or more temperature sensors are in direct contact with the material film.

5. The thin-film treatment apparatus as claimed in claim 1, wherein at least some of the rotor blades are configured in the form of wiper blade elements which, at least in a region facing the inner face of the housing casing, form an angle in relation to the rotor axis.

6. The thin-film treatment apparatus as claimed in claim 3, wherein the signal line is at least partially fed through an axially extending signal line duct in the rotor shaft body.

7. The thin-film treatment apparatus as claimed in claim 1, wherein inside the housing casing is formed a housing casing cavity, through which a heat carrier medium can be flowed for heating and/or cooling purposes.

8. The thin-film treatment apparatus as claimed in claim 1, wherein the housing casing comprises at least two housing casing segments which are designed so as to be heated and/or cooled independently of one another.

9. The thin-film treatment apparatus as claimed in claim 8, wherein the housing casing segments respectively enclose a corresponding treatment chamber zone and wherein the temperature sensors are distributed amongst different treatment chamber zones.

10. The thin-film treatment apparatus as claimed in claim 3, wherein the rotor shaft is provided a slip ring arrangement arranged outside the treatment chamber for transmitting to an evaluation unit the signal conducted through the rotor shaft body.

11. The thin-film treatment apparatus as claimed in claim 1, wherein in the rotor shaft body is provided an axially extending duct for the introduction of a substance.

12. The thin-film treatment apparatus as claimed in claim 1, wherein, at least in one of those regions of the thin-film treatment apparatus in which a temperature sensor is arranged, a heat carrier temperature sensor is arranged in the corresponding region of the housing casing.

13. The thin-film treatment apparatus as claimed in claim 1, wherein each of the plurality of temperature sensors extends from the rotor shaft body at points different from where the rotor blades extend.

14. The thin-film treatment apparatus as claimed in claim 1, wherein each of the plurality of temperature sensors extends out from the rotor shaft body perpendicular to a rotor shaft body axis of rotation.

\* \* \* \* \*